United States Patent
Okazaki (10) Patent No.: US 7,054,390 B2
(45) Date of Patent: May 30, 2006

(54) RECEIVER AND ADAPTIVE EQUALIZING METHOD

(75) Inventor: Akihiro Okazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 892 days.

(21) Appl. No.: 10/111,420

(22) PCT Filed: Sep. 6, 2001

(86) PCT No.: PCT/JP01/07725

§ 371 (c)(1),
(2), (4) Date: May 7, 2002

(87) PCT Pub. No.: WO02/25835

PCT Pub. Date: Mar. 28, 2002

(65) Prior Publication Data

US 2002/0154690 A1  Oct. 24, 2002

(30) Foreign Application Priority Data

Sep. 21, 2000  (JP) .............................. 2002-287699

(51) Int. Cl.
*H04L 27/06* (2006.01)
*H04B 1/10* (2006.01)

(52) U.S. Cl. ...................... 375/340; 375/350; 375/354

(58) Field of Classification Search ................ 375/232, 375/340, 350, 354, 362, 365–370
See application file for complete search history.

(56) References Cited

U.S. PATENT DOCUMENTS

| 5,081,051 A | 1/1992 | Mattingly et al. |
| 5,146,475 A | 9/1992 | Kubo |
| 5,164,964 A | 11/1992 | Kubo |
| 5,727,032 A * | 3/1998 | Jamal et al. ................. 375/347 |
| 5,991,349 A * | 11/1999 | Chen .......................... 375/355 |

(Continued)

FOREIGN PATENT DOCUMENTS

JP  6-164456  6/1994

(Continued)

OTHER PUBLICATIONS

Hiroshi Kubo et al.: "Adaptive maximum-likelihood sequence estimation by means of combined equalization and decoding in fading environments" IEEE Journal on Selected Areas in Communications, vol. 13, No. 1, pp. 102-109 Jan. 1995.

(Continued)

*Primary Examiner*—Don N. Vo
(74) *Attorney, Agent, or Firm*—Oblon, Spivak, McClelland, Maier & Neustadt, P.C.

(57) ABSTRACT

An adaptive equalization apparatus within a receiver comprises a timing detector (101) that detects a timing suitable for an adaptive equalization processing, by using a first unique word, a timing adjuster (100) that extracts a standardized received signal based on a detection timing, a CIR initial value estimator (103) that estimates an initial value of a channel impulse response by using a first unique word, a CIR initial value setter (104) that sets a plurality of channel impulse response initial values based on estimated initial value, and an adaptive equalizer (102) that individually judges presence or absence of a timing slip when each initial value is used, by judging a distance between a first unique word and a second unique word disposed at a back side, and obtains a decision value by using a channel impulse response initial value that does not generate a timing slip and the extracted received signal.

4 Claims, 10 Drawing Sheets

U.S. PATENT DOCUMENTS

| | | | | |
|---|---|---|---|---|
| 5,995,568 A | * | 11/1999 | Molnar et al. | 375/354 |
| 6,212,371 B1 | | 4/2001 | Sakuma | |
| 6,226,049 B1 | * | 5/2001 | Oh | 348/607 |
| 6,404,831 B1 | * | 6/2002 | Melas | 375/350 |

FOREIGN PATENT DOCUMENTS

| | | |
|---|---|---|
| JP | 6-216810 | 8/1994 |
| JP | 8-274693 | 10/1996 |
| JP | 9-8715 | 1/1997 |
| JP | 11-239082 | 8/1999 |

OTHER PUBLICATIONS

G. David Forney: "Maximum-likelihood sequence estimation of digital sequences in the presence of intersymbol interference" IEEE Transactions on Information Theory, vol. IT-18, No. 3, pp. 363-378 May 1972.

Hiroshi Kubo et al.: "An adaptive maximum-likelihood sequence estimator for fast time-varying Intersymbol interference channels" IEEE Transactions on Communications, vol. 42, No. 2/3/4, pp. 1872-1880 Feb. 1994, Mar. 1994, Apr. 1994.

Patent Abstracts of Japan, JP 06-164456, Jun. 10, 1994.
Patent Abstracts of Japan, JP 11-239082, Aug. 31, 1999.
Patent Abstracts of Japan, JP 08-274693, Oct. 18, 1996.
Patent Abstracts of Japan, JP 09-008715, Jan 10, 1997.

* cited by examiner

CHANNEL CIR

SET CIR

RECEIVER AND ADAPTIVE EQUALIZING METHOD

TECHNICAL FIELD

The present invention relates to the field of a receiver that is used in an automobile telephone or the like, and a method of performing adaptive equalization processing that can be applied to radio communications that are carried out while moving at a high speed.

BACKGROUND ART

An equalizer that has been used in a conventional receiver will be explained. In digital radio communications that are carried out using portable telephones or the like, a delayed wave that cannot be disregarded in data symbols based on a multi-path propagation could occur. When this delayed wave has occurred, interference is generated in data symbols. This is called inter-symbol interference (ISI). As one of reception techniques that overcome this ISI, there is equalization technique.

The operation of an equalizer that uses the above equalization technique will be explained. A replica preparation type maximum likelihood sequence estimator (MLSE equalizer) will be explained as one example (For the MLSE equalizer, refer to "Maximum-likelihood sequence estimation of digital sequences in the presence of intersymbol interference", G. D. Forney, Jr., IEEE Trans. Inform, Theory, vol. IT-18, 3, pp. 363–378, May, 1972).

The MLSE equalizer estimates an amplitude, a phase, and a delay time of a signal that arrives with a time variance based on a multi-path propagation, by using known series called a unique word at a receiver side in advance. This estimates a channel distortion generated based on a multi-path propagation. A result of this estimation is called a channel impulse response (CIR). The MLSE equalizer prepares a reception signal candidate (a replica) for estimated data symbol candidates, by using this CIR. The MLSE equalizer compares this replica with a reception signal, decides a data symbol candidate corresponding to a replica that is most similar (a highest likelihood) as a decision data symbol, and carries out a demodulation. In this way, the MLSE equalizer compensates for a channel distortion due to a delayed wave by using the estimated CIR, thereby to conquer the ISI.

However, in the mobile communications, a signal channel changes to the other path depending on time when the terminal moves. In other words, the CIR that is necessary for the MLSE equalizer varies with time. The CIR estimated by the MLSE equalizer is the CIR that has been estimated at the time when a unique word has been transmitted. When a signal at a different time from this time is demodulated, a CIR variation becomes an error, and a characteristic is degraded as a result.

In the mean time, there has been proposed an adaptive equalizer that follows a variation in channels. (For the adaptive equalizer that follows a variation in channels, refer to "An adaptive maximum-likelihood sequence estimation for fast time-varying intersymbol interference channels", H. Kubo, K. Murakami and T. Fujino, IEEE Trans. Commun., vol. COM-42, 2/3/4, pp. 1872–1880, February/March/April, 1997.) This adaptive equalizer estimates a CIR initial value by using a unique word. Further, this adaptive equalizer sequentially estimates CIRs that vary with time by using a demodulated data symbol, thereby to follow variations in channels. Based on this, it becomes possible to carry out the equalization processing even under a condition of fast changing channels.

Figure 6:
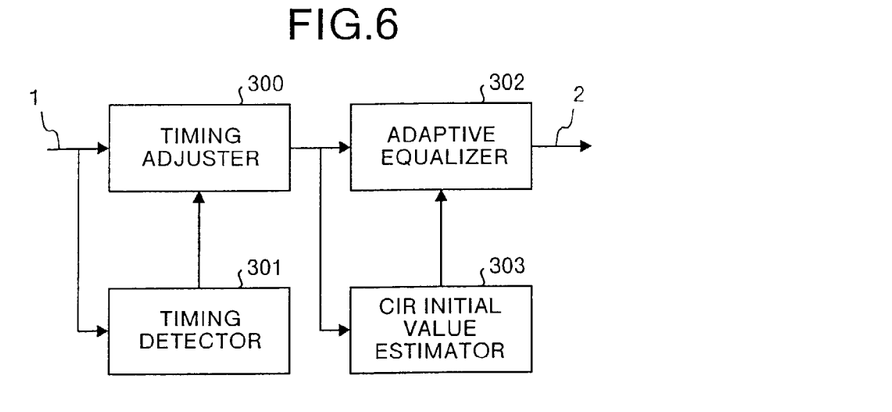
FIG. 6 is a diagram which shows a structure of a conventional adaptive equalization apparatus.

A representative operation of an adaptive equalization apparatus will be explained below with reference to the drawings. FIG. 6 is a diagram which shows a structure of a conventional adaptive equalization apparatus. In FIG. 6, the reference number 1 denotes a receiving-signal input terminal, 2 denotes a decision value output terminal, 300 denotes a timing adjuster, 301 denotes a timing detector, 302 denotes an adaptive equalizer, and 303 denotes a CIR initial value setter.

In the conventional adaptive equalization apparatus shown in FIG. 6, the timing detector 301 first obtains a timing of a unique word based on a received signal, and the timing adjuster 300 adjusts the timing by using this timing. Next, the CIR initial value estimator 303 estimates a CIR initial value by using a unique word within a received signal after the timing adjustment. Finally, the adaptive equalizer 302 sequentially estimates CIRs that vary with time based on the estimated CIR initial value, and then obtains decision value by using the estimated CIR value and the received signal.

Figure 7:
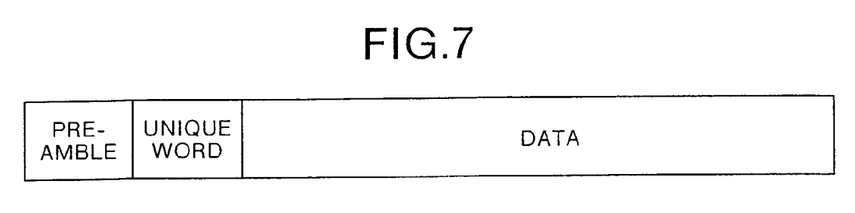
FIG. 7 is a diagram which shows a representative burst format when an adaptive equalization apparatus is used.

FIG. 7 is a diagram which shows a representative burst format when an adaptive equalization apparatus is used. As shown in the drawing, the burst format is constructed of a preamble, a unique word, and data.

Figure 8:
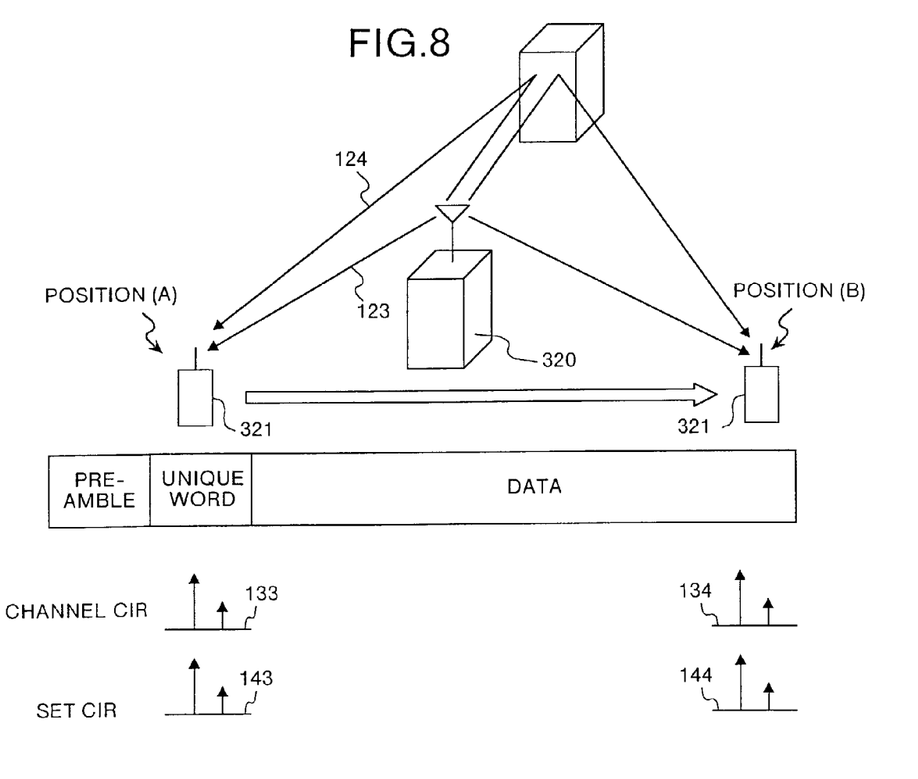
FIG. 8 is a diagram which shows a communication system that comprises a receiver having an adaptive equalization apparatus, and a base station.

FIG. 8 is a diagram which shows a communication system that comprises a receiver having the above adaptive equalization apparatus, and a base station. It is assumed that a mobile station 321 moves from one position ("position (A)") to another position ("position (B)") as shown in the drawing will be explained. The reference number 320 denotes a base station, and 321 denotes the same mobile station. The reference number 123 denotes a direct wave that directly reaches the mobile station 321 from the base station 320, and 124 denotes a wave from the base station 320 that is reflected by an obstacle and reaches the mobile station 321. The reference number 133 denotes a channel CIR in the mobile station 321, 134 denotes a channel CIR in the mobile station 321 after the movement, 143 denotes a set CIR in the mobile station 321, and 144 denotes a set CIR in the mobile station 321 after the movement.

The reflection wave 124 has to travel a longer distance than the direct wave 123, and therefore, arrival of this reflection wave 124 at the mobile station 321 is delayed. Assume that the arrival time of the reflection wave 124 is delayed by one data symbol component from the arrival time of the direct wave 123. The left-side CIR shows the direct wave and the right-side CIR shows the reflection wave.

When the mobile station 321 is at the position (A) during a reception of a unique word, and the mobile station 321 is at the position (B) at the time of finishing a burst (time required for the movement is assumed to be equivalent to one burst time), for example, the channel CIR 133 changes to the channel CIR 134. In this instance, the adaptive equalizer 302 estimates a CIR initial value by using a unique word, and obtains the set CIR 143 after that. At the data transmission time, the adaptive equalizer 302 updates the CIR, and follows CIRs finally up to the set CIR 144. A demodulation time is obtained from the unique word that is included in the direct wave 123, and a constant timing is obtained over the data section.

Further, as an application of the above adaptive equalization apparatus, there has been proposed a blind equalization apparatus. The blind equalization apparatus is constructed of an adaptive equalization apparatus that does not require a CIR initial value estimated from the unique word.

Figure 9:
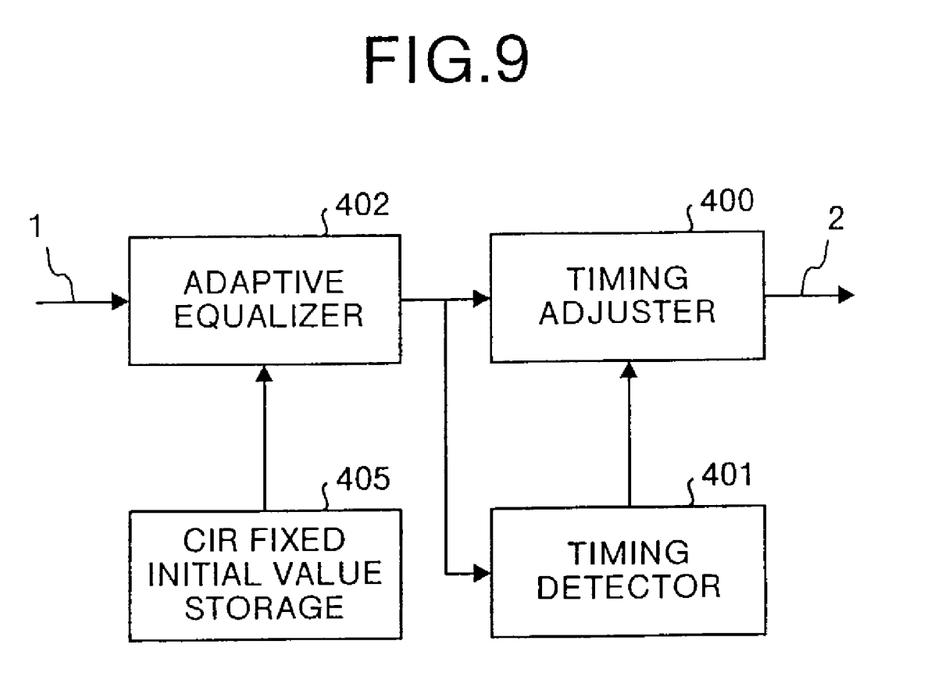
FIG. 9 is a diagram which shows a structure of a conventional blind equalization apparatus.

A representative operation of the blind equalization apparatus will be explained next with reference to the drawings. FIG. 9 is a diagram which shows a structure of a conventional blind equalization apparatus. The reference number 400 denotes a timing adjuster, 401 denotes a timing detector, 402 denotes an adaptive equalizer, and 405 denotes a CIR fixed initial value storage.

According to the conventional blind equalization apparatus shown in FIG. 9, the adaptive equalizer 402 does not require a CIR initial value estimated from a unique word. Therefore, usually, an optional CIR fixed initial value is given from the CIR fixed initial value storage 405 as the CIR initial value. Next, the adaptive equalizer 402 estimates a CIR initial value by using this CIR fixed initial value and a preamble section. Thereafter, the adaptive equalizer 402 sequentially estimates CIRs in the unique word section and the data section, and obtains decision value by using the CIR and the received signal. The timing detector 401 that has received the decision value obtains a decision value timing from a unique word position in the decision value. Last, the timing adjuster 400 adjusts the timing based on the decision value timing.

Figure 10:
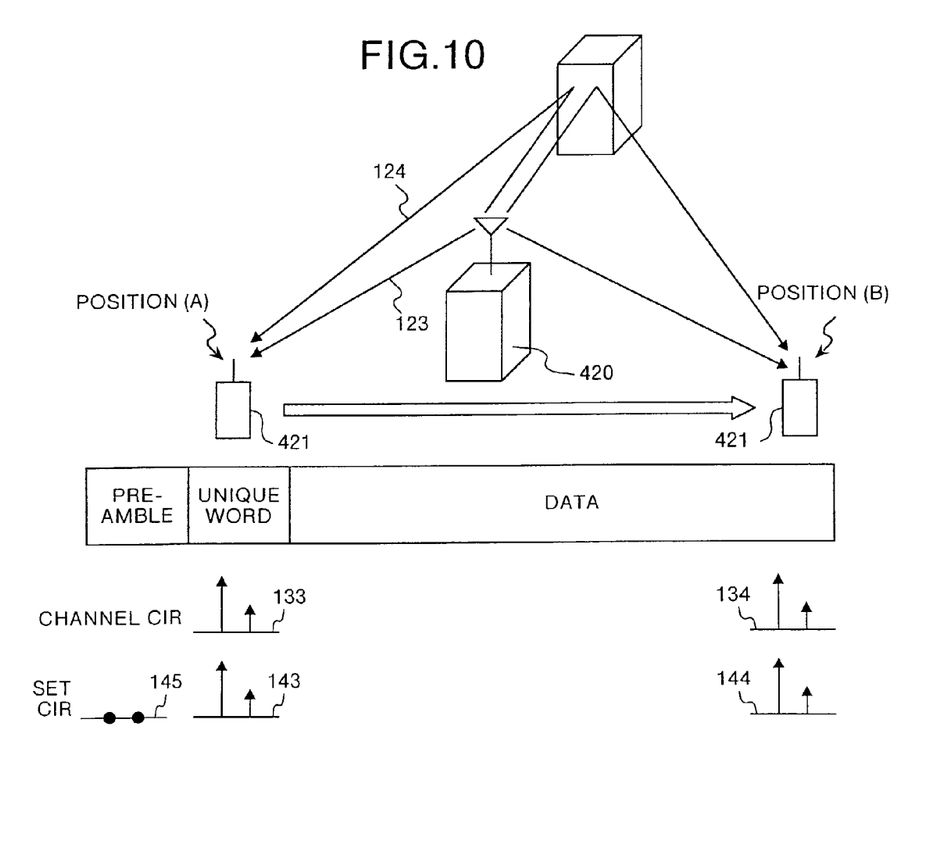
FIG. 10 is a diagram which shows a communication system that comprises a receiver having a blind equalization apparatus, and a base station.

FIG. 10 is a diagram which shows a communication system that comprises a receiver having the above blind equalization apparatus, and a base station. The reference number 420 denotes a base station, and 421 denotes a mobile station. The reference number 145 denotes a CIR fixed initial value that the adaptive equalizer 402 receives. The direct wave component and the delayed wave component are zero. The adaptive equalizer 402 estimates an initial value of the CIR by using the CIR initial value 145 and the preamble section, and obtain a set CIR 143 in the unique word section. Then, the adaptive equalizer 402 carries out a demodulation in the data section, and outputs a decision value.

However, according to the above conventional adaptive equalization apparatus and blind equalization apparatus, there has been a problem that a timing deviation occurs due to a timing slip. A timing slip that causes this problem will be explained in detail next.

Figure 11:
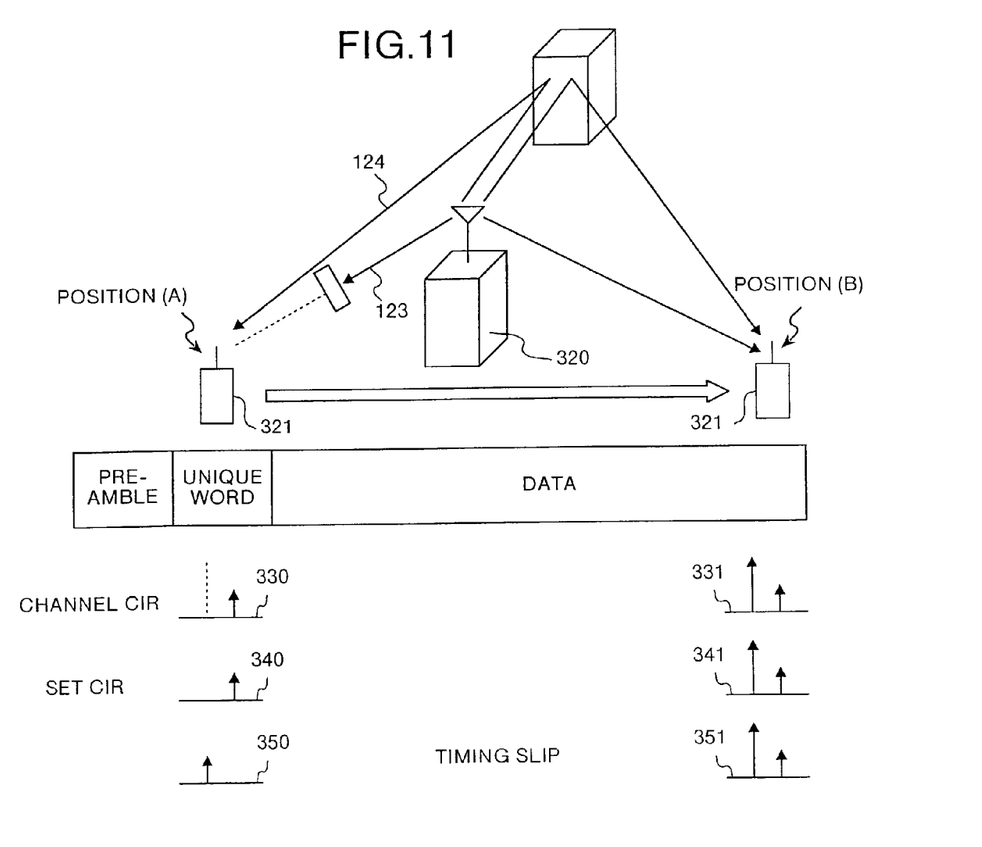
FIG. 11 is a diagram that explains a timing slip in a conventional adaptive equalization apparatus.

FIG. 11 is a diagram that explains a timing slip in the above conventional adaptive equalization apparatus. The reference numbers 330 and 331 denote channel CIRs, and 340, 341, 350 and 351 denote set CIRs. Assume that a direct wave 123 to a mobile station 321 is interfered by an obstacle, and only a reflection wave 124 reaches the position (A).

In this instance, the adaptive equalizer 302 estimates a transmission CIR from a unique word. However, in the status of the current condition, that is, only one wave (a reflection wave, in this example) arrives, it is not possible to judge whether this wave is a preceding wave or a delayed wave. This status is called a timing ambiguity.

When a wave has been decided as a delayed wave, the mobile station 321 moves from the position (A) to the position (B), and a normal operation is carried out (as usual) when a direct wave arrives.

On the other hand, when a wave has been decided as a preceding wave, the reflection wave is handled as a preceding wave. When a direct wave has arrived without an obstacle, for example, a preceding wave is generated after one preceding wave. In this instance, when there is an obstacle, the adaptive equalizer 302 outputs a decision value after demodulation at a timing obtained from a reflection wave. When there is no obstacle, the adaptive equalizer 302 outputs a decision value after demodulation at a timing obtained from a direct wave. In other words, there occurs a phenomenon that output timings of decision values are different between when an obstacle is present and when an obstacle is not present. This phenomenon is called a timing slip.

Figure 12:
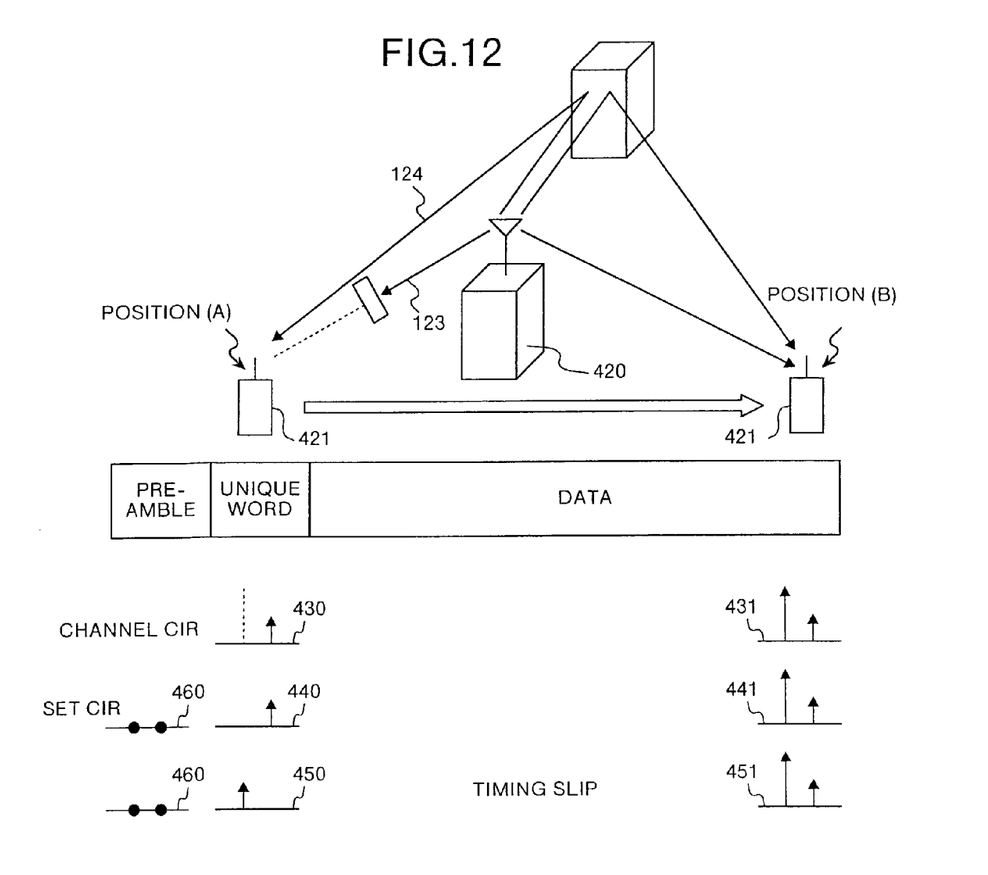
FIG. 12 is a diagram that explains a timing slip in a conventional blind equalization apparatus.

FIG. 12 is a diagram that explains a timing slip in the above conventional blind equalization apparatus. The reference numbers 430 and 431 denote channel CIRs, and 440, 441, 450 and 451 denote set CIRs. The reference number 460 denotes a CIR initial value that the adaptive equalizer receives. A direct wave component and a delayed wave component are zero.

In this instance, there is a possibility that the adaptive equalizer 402 estimates CIRs in two ways of ICR 440 and CIR 450 by using a preamble section in a similar manner to the above. However, when the adaptive equalizer 402 has estimated the CIR 450, a timing slip occurs at a point of time when a direct wave has arrived like in the above example.

DISCLOSURE OF THE INVENTION

It is an object of the present invention to provide a receiver and a method of performing adaptive equalization processing that can avoid a timing ambiguity by selecting an ICR initial value that does not generate a timing slip in the environment that a direct wave is interfered by an obstacle and only a delayed wave arrives, and the direct wave arrives in the middle.

The receiver according to one aspect of the present invention comprises an adaptive equalization apparatus that judges transmission data series based on an adaptive equalization processing, wherein the adaptive equalization apparatus comprises, a timing detecting unit (corresponding to a timing detector 101 in an embodiment to be described later) that detects a timing suitable for an adaptive equalization processing, by using a first unique word that is disposed at a front side of a burst format that constitutes a received signal, a received signal extracting unit (corresponding to a timing adjuster 100) that extracts a standardized received signal based on the detected timing, a CIR initial value estimating unit (corresponding to a CIR initial value estimator 103) that estimates an initial value of a channel impulse response by using a first unique word included in the extracted received signal, a CIR initial value setting unit (corresponding to a CIR initial value setter 104) that sets a plurality of channel impulse response initial values of different timings based on the estimated initial value, and an adaptive equalizing unit (corresponding to an adaptive equalizer 102) that individually judges presence or absence of a timing slip when each initial value is used, by judging a distance between the first unique word and a second unique word disposed at a back side, and obtains a decision value by using a channel impulse response initial value that does not generate a timing slip and the extracted received signal.

The receiver according to another aspect of the present invention comprises a blind equalization apparatus that judges transmission data series based on an adaptive equalization processing, wherein the blind equalization apparatus comprises, a CIR initial value setting unit (corresponding to a CIR initial value setter 204) that sets a plurality of channel impulse response fixed initial values of different timings, an adaptive equalizing unit (corresponding to an adaptive equalizer 202) that individually judges presence or absence of a timing slip when each fixed initial value is used, by judging a distance between a first unique word disposed at a front side of a burst format that constitutes a received signal and a second unique word disposed at a back side of the burst format, and obtains a decision value by using a channel impulse response fixed initial value that does not generate a timing slip and the received signal, a timing detecting unit (corresponding to a timing detector 101) that detects a data timing from the decision value, and a decision value extracting unit (corresponding to a timing adjuster 100) that extracts the decision value based on the detected timing.

The method of performing adaptive equalization processing according to still another aspect of the present invention comprises a timing detecting step of detecting a timing suitable for an adaptive equalization processing, by using a first unique word that is disposed at a front side of a burst format that constitutes a received signal, a received signal extracting step of extracting a standardized received signal based on the detected timing, a CIR initial value estimating step that estimates an initial value of a channel impulse response by using a first unique word included in the extracted received signal, a CIR initial value setting step of setting a plurality of channel impulse response initial values of different timings based on the estimated initial value, and an adaptive equalizing step of individually judging presence or absence of a timing slip when each initial value is used, by judging a distance between the first unique word and a second unique word disposed at aback side, and obtaining a decision value by using a channel impulse response initial value that does not generate a timing slip and the extracted received signal.

The method of performing adaptive equalization processing according to still another aspect of the present invention comprises a CIR initial value setting step of setting a plurality of channel impulse response fixed initial values of different timings, an adaptive equalizing step of individually judging presence or absence of a timing slip when each fixed initial value is used, by judging a distance between a first unique word disposed at a front side of a burst format that constitutes a received signal and a second unique word disposed at a back side of the burst format, and obtaining a decision value by using a channel impulse response fixed initial value that does not generate a timing slip and the received signal, a timing detecting step of detecting a data timing from the decision value, and a decision value extracting step of extracting the decision value based on the detected timing.

BEST MODE FOR CARRYING OUT THE INVENTION

Embodiments of the receiver and the method of performing adaptive equalization processing according to the present invention will be explained in detail below with reference to the drawings. The present invention is not limited to these embodiments.

FIRST EMBODIMENT

Figure 1:
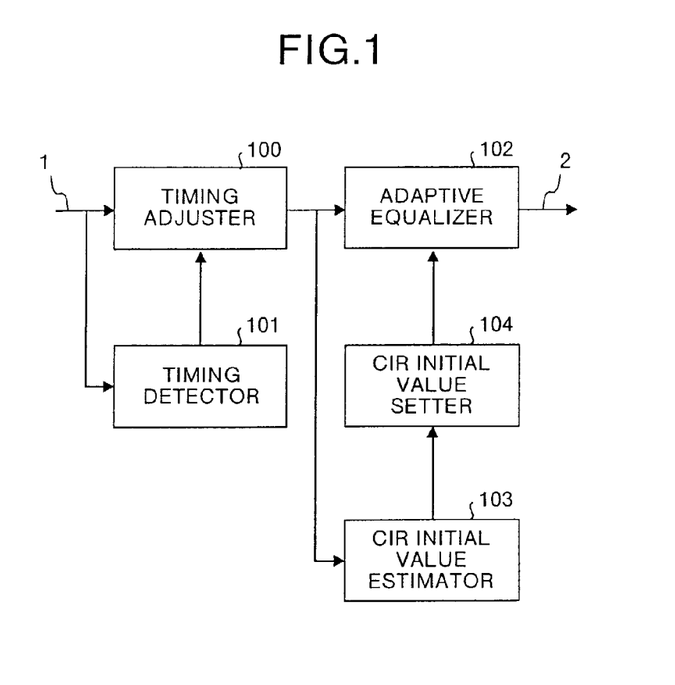
FIG. 1 is a diagram which shows a structure of a first embodiment of a receiver according to the present invention.

FIG. 1 is a diagram which shows a structure of a first embodiment of a receiver according to the present invention. Specifically, this diagram shows a structure of an adaptive equalizer that is used in the receiver according to the present invention. The reference number 1 denotes a receiving-signal input terminal, 2 denotes a decision value output terminal, 100 denotes a timing adjuster, 101 denotes a timing detector, 102 denotes an adaptive equalizer, 103 denotes a CIR initial value estimator, and 104 denotes a CIR initial value setter.

The operation of the adaptive equalization apparatus shown in FIG. 1 will be explained below. The timing detector 101 receives a signal via the receiving-signal input terminal 1, and obtains a timing of a unique word that is included in the received signal. Then, the timing adjuster 100 adjusts a timing based on the detected timing. In other words, the timing adjuster 100 extracts a standardized received signal.

Next, the CIR initial value estimator 103 estimates a CIR initial value by using a unique word that is included in the received signal after the timing adjustment. The CIR initial value setter 104 sets a suitable CIR initial value to the adaptive equalizer by using the estimated CIR initial value.

Finally, the adaptive equalizer 102 sequentially updates CIRs based on the set CIR initial value, and carries out demodulation by using the estimated CIR and the received signal after the timing adjustment. The adaptive equalizer 102 outputs a decision value after the demodulation to the decision value output terminal 2.

The operation of the CIR initial value setter 104 and the adaptive equalizer 102 that are the characteristic features of the present invention will be explained in detail below. When the CIR initial value estimator 103 has estimated power to all taps, for example, the CIR initial value setter 104 sets the estimated CIR to the adaptive equalizer 102 as the CIR initial value. On the other hand, when there exists a CIR with small power among CIRs estimated by the CIR initial value estimator 103, there exists the above timing ambiguity. Therefore, the CIR initial value estimator 103 sets CIRs of different timings to the adaptive equalizer 102 as CIR initial values. In other words, the CIR initial value estimator 103 sets a plurality of CIR initial values by using one estimated CIR. In this instance, the adaptive equalizer 102 carries out a predetermined operation in CIR initial value unit, and obtains a plurality of decision results.

Figure 2:
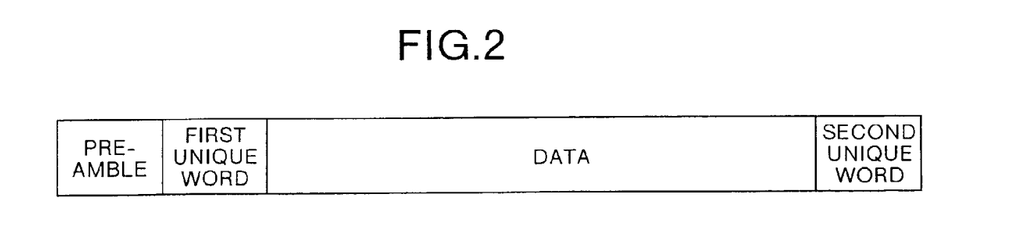
FIG. 2 is a diagram which shows a burst format that is used in an adaptive equalizer of the first embodiment.
Figure 3:
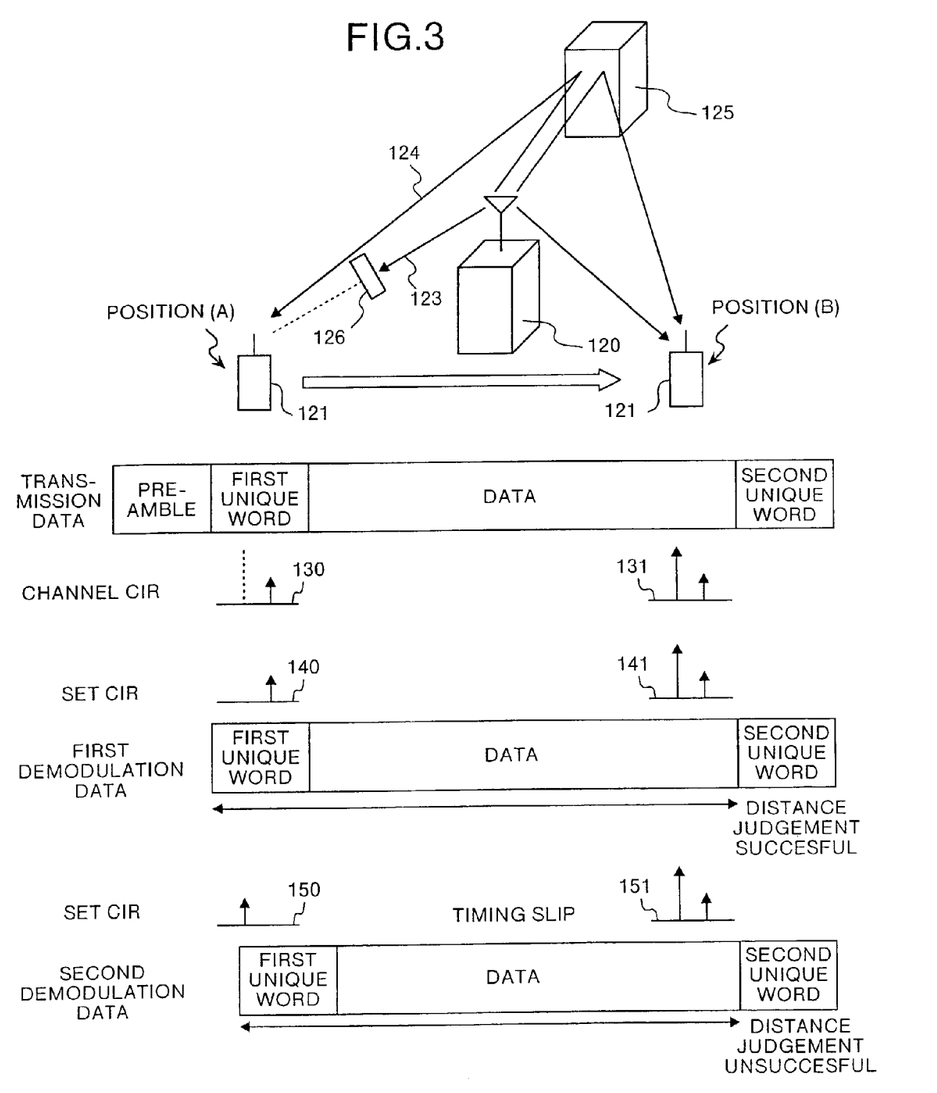
FIG. 3 is a diagram which shows a communication system that comprises a receiver having the adaptive equalizer of the first embodiment, and a base station.

FIG. 2 is a diagram which shows a burst format that is used in the adaptive equalizer of the present embodiment. In the present embodiment, the burst format is constructed of a preamble, a first unique word, data, and a second unique word. FIG. 3 is a diagram which shows a communication system that comprises a receiver having the above adaptive equalizer, and a base station.

In FIG. 3, the reference number 120 denotes a base station, 121 denotes a mobile station, 125 denotes a reflecting object, 126 denotes an obstacle, and 123 denotes a direct wave that directly reaches the mobile station 121 from the base station 120. The reference number 124 denotes a wave that is transmitted from the base station 120 and is reflected by the reflecting object 125 and reaches the mobile station 121. The reference number 130 denotes a channel CIR at the position (A), 131 denotes a channel CIR at the position (B), 140 denotes a set CIR at the position (A), 141 denotes a set CIR at the position (B), 150 denotes a set CIR at the position (A), and 151 denotes a set CIR at the position (B).

The reflection wave 124 travels longer than the direct wave 123, and therefore, an arrival time of this reflection wave 124 at the mobile station is delayed. Assume that the arrival time of the reflection wave 124 is delayed by one data symbol component from the arrival time of the direct wave 123. The left-side CIR shows the direct wave 123 and the right-side CIR shows the reflection wave 124.

It is assumed that the mobile station 121 moves from the position (A) to the position (B). A channel in which a delay of one data symbol occurs will be assumed. Further, it is assumed that the adaptive equalization apparatus has two taps. A tap corresponding to a preceding wave will be called a preceding-wave tap, and a tap corresponding to a delayed wave will be called a delayed-wave tap.

When the mobile station 121 is at the position (A) only the reflection wave 124 reaches this mobile station 121, as the direct wave 123 is being interfered by the obstacle 126. In this instance, power is generated in only the delayed-wave tap, in the channel CIR 130 at the position (A). Therefore, power is generated in only one tap, and power becomes substantially zero in the other tap, in the CIR estimated by the CIR initial value estimator 103. When power is generated in only one tap in the processing of the CIR initial value estimator 103 as explained above, the CIR initial value setter 104 sets CIRs having power to the preceding-wave tap (corresponding to the set CIR 150) and the delayed-wave tap (corresponding to the set CIR 140) respectively.

The set CIR 140 is an example that the CIR has been set to the delayed-wave tap. As the reflection wave 124 is handled as a delayed wave, the adaptive equalizer 102 operates normally (as usual), even when the mobile station 121 moves from the position (A) to the position (B), and the direct wave 123 arrives in the middle. In other words, a timing slip does not occur in a data section that is included in a first demodulation data (a demodulation result) shown in the drawing. Therefore, a distance between the first unique word and the second unique word in the first demodulation data becomes the same as the transmission data distance shown in the drawing that is known in advance.

On the other hand, the set CIR 150 is an example that the CIR has been set to the preceding-wave tap. As the reflection wave 124 is handled as a preceding wave, a further preceding wave of the preceding wave is generated at the arrival time of the direct wave 123, when the mobile station 121 has moved from the position (A) to the position (B). In the instance of the adaptive equalizer 102 that follows variations in the channels, the adaptive equalizer 102 handles the preceding wave (the reflection wave 124) as a delayed wave, at the point of time when the direct wave has arrived. Then, the adaptive equalizer 102 handles the new arrival wave (the direct wave 123) as the preceding wave, and continues the operation.

Therefore, when the obstacle 126 exists, the adaptive equalizer 102 carries out a decision processing at the timing obtained from the reflection wave 124. When the obstacle 126 does not exist, the adaptive equalizer 102 carries out a decision processing at the timing obtained from the direct wave 123. In other words, the timing of the decision processing changes in the middle of the data section, and a timing slip occurs in the data section that is included in a second demodulation data (a demodulation result) shown in the drawing. Therefore, a distance between the first unique word and the second unique word becomes different from the transmission data distance shown in the drawing that is known in advance.

After the two CIR initial values have been set, the adaptive equalizer 102 judges the distance between the first unique word and the second unique word, thereby to judge presence or absence of a timing slip. The adaptive equalizer 102 obtains a decision value based on a demodulation by using the CIR initial value that does not generate a timing slip and a received signal, and outputs this decision value to the decision value output terminal 2.

As explained above, according to the present embodiment, the adaptive equalizer is structured such that the CIR initial value setter 104 sets a plurality of CIR initial values corresponding to arrival waves to the adaptive equalizer 102, and further, the adaptive equalizer 102 judges a distance between unique words for individual demodulation results obtained based on the CIR initial values, and selects a CIR initial value that does not generate a timing slip. Therefore, it is possible to remove the conventional timing ambiguity.

In the first embodiment, a two-tap adaptive equalization apparatus corresponding to one symbol delay has been explained for the convenience of the explanation. However, the adaptive equalization apparatus is not limited to the above structure. It is also possible to obtain a similar effect to the above, when the invention is applied to an adaptive equalization apparatus of a plurality of taps corresponding to a plurality of symbol delays.

SECOND EMBODIMENT

Figure 4:
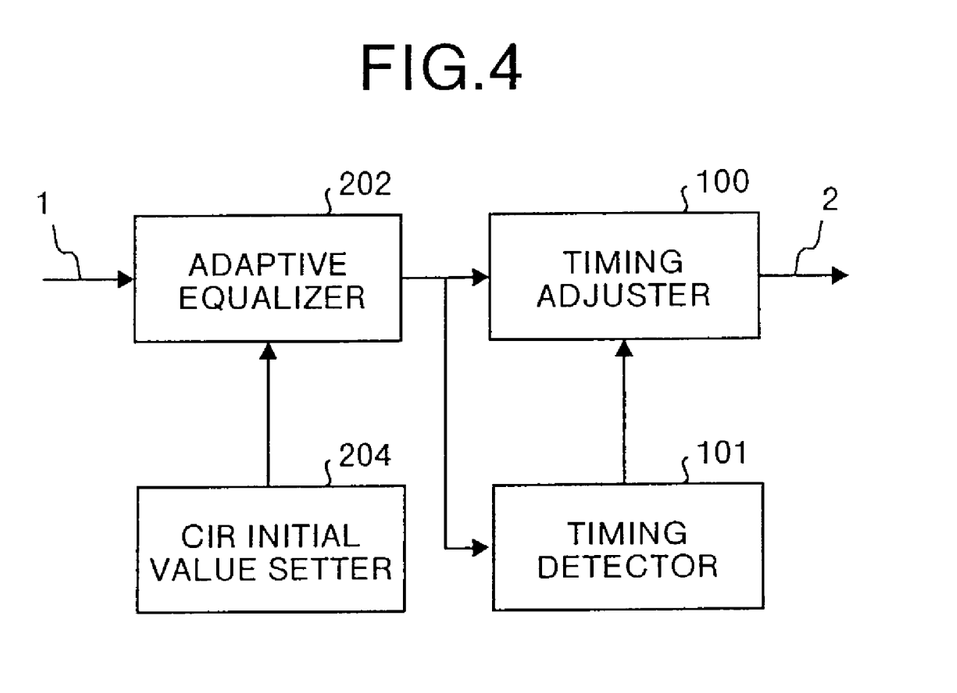
FIG. 4 is a diagram which shows a structure of a second embodiment of a receiver according to the present invention.

FIG. 4 is a diagram which shows a structure of a second embodiment of a receiver according to the present invention. Specifically, this diagram shows a structure of a blind equalizer that is used in the receiver according to the present invention. The reference number 202 denotes an adaptive equalizer, and 204 denotes a CIR initial value setter. In the second embodiment, structural parts similar to those of the first embodiment are attached with like reference numbers, and their explanation will be omitted. A burst format that is used in the present embodiment is similar to that shown in FIG. 2 used in the first embodiment.

The adaptive equalizer 202 that is used in the blind equalization apparatus does not require a CIR initial value that is estimated from a unique word included in a received signal. Therefore, the CIR initial value setter 204 gives an optional CIR fixed initial value to the adaptive equalizer 202. The adaptive equalizer 202 estimates an initial CIR by using the received CIR fixed initial value and a preamble section included in the received signal. Then, the adaptive equalizer 202 sequentially estimates CIRs in the unique word section and the data section, and obtains a decision value by using the set CIR and the received signal.

A timing detector 101 receives a decision value, and obtains a decision value timing from a unique word position in the decision value. Last, a timing adjuster 100 adjusts a timing based on the decision value timing, and outputs a decision value after the timing adjustment to a decision value output terminal 2.

The operation of the CIR initial value setter 204 and the adaptive equalizer 202 that become the characteristics of the present invention will be explained in detail below. The CIR initial value setter 204 sets CIR fixed initial values of different timings to the adaptive equalizer 202. In other words, the CIR initial value setter 204 sets a plurality of CIR fixed initial values. The adaptive equalizer 202 carries out a predetermined operation in CIR fixed initial value unit, and obtains a plurality of decision results.

Figure 5:
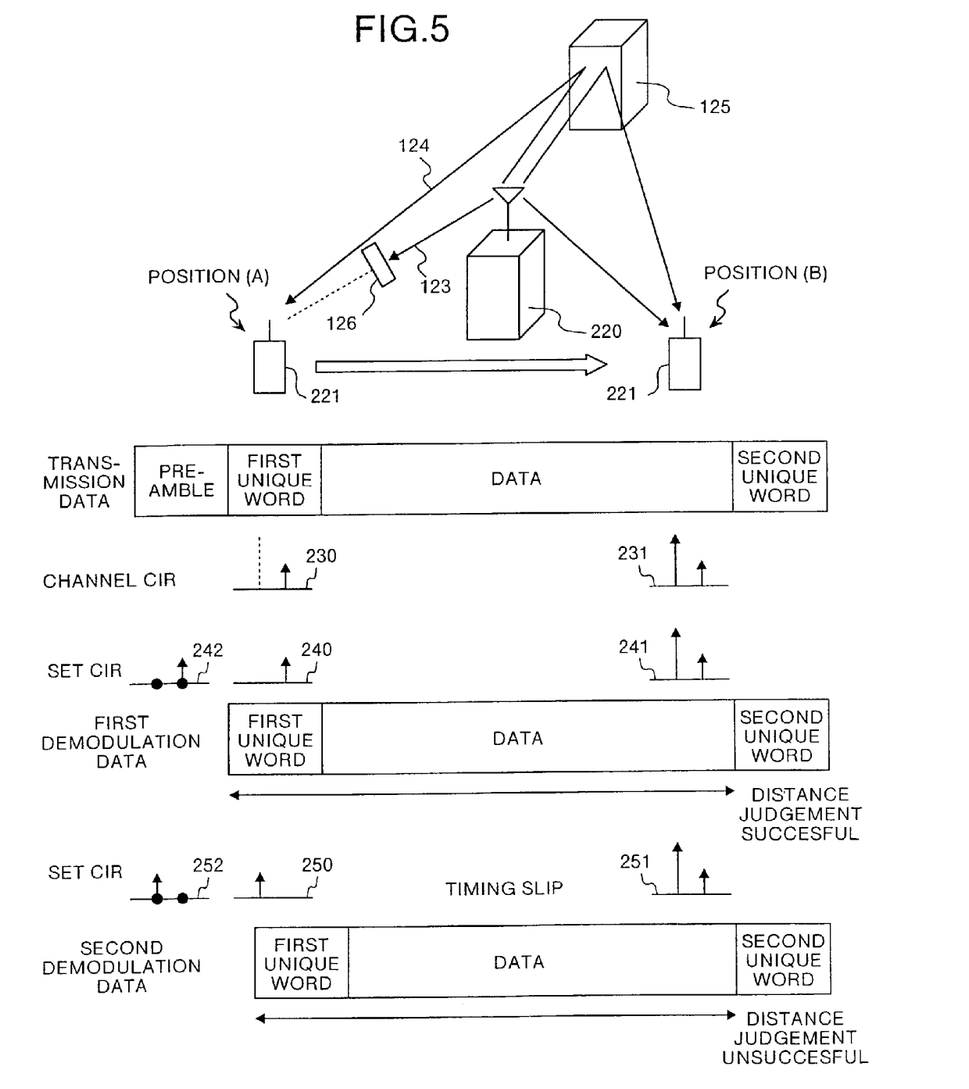
FIG. 5 is a diagram which shows a communication system that comprises a receiver having a blind equalizer of the second embodiment, and a base station.

FIG. 5 is a diagram which shows a communication system that comprises a receiver having the above blind equalizer, and a base station. The reference number 220 denotes a base station, 221 denotes a mobile station, 123 denotes a direct wave that directly reaches the mobile station 221 from the base station 220. The reference number 124 denotes a wave that is transmitted from the base station 220 and is reflected by a reflecting object 125 and reaches the mobile station 121. The reference number 230 denotes a channel CIR at the position (A), 231 denotes a channel CIR at the position (B) 240 denotes a set CIR at the position (A), 241 denotes a set CIR at the position (B), 250 denotes a set CIR at the position (A), and 251 denotes a set CIR at the position (B) Reference numbers 242 and 252 denote CIR fixed initial value that the adaptive equalizer 202 receives.

In the present embodiment, a move of the mobile station 121 from the position (A) to the position (B) as shown in the drawing will be explained. A channel in which a delay of one data symbol occurs will be assumed. Further, it is assumed that the adaptive equalization apparatus has two taps. A tap corresponding to a preceding wave will be called a preceding-wave tap, and a tap corresponding to a delayed wave will be called a delayed-wave tap.

When the CIR initial value setter 204 has applied the CIR fixed initial value 242 having constant power that is in only the delayed-wave tap, the adaptive equalizer 202 estimates an initial CIR by using a preamble section and the CIR fixed initial value 242. When the CIR 240 is estimated in the unique word section, the reflection wave 124 is handled as a delayed wave. Therefore, a timing slip does not occur when the mobile station 221 moves from the position (A) to the position (B), and the direct wave 123 arrives in the middle. That is, a timing slip does not occur in the whole data section. In other words, a timing slip does not occur in the data section that is included in a first demodulation data shown in the drawing. Therefore, a distance between the first unique word and the second unique word in the first demodulation data becomes the same as the transmission data distance shown in the drawing that is known in advance.

On the other hand, when the CIR initial value setter 204 has applied the CIR fixed initial value 252 having constant power that is in only the preceding-wave tap, the adaptive equalizer 202 estimates an initial CIR by using a preamble section and the CIR fixed initial value 252. When the CIR 250 is estimated in the unique word section, the reflection wave is handled as a preceding wave. Therefore, a further preceding wave of the preceding wave is generated at the arrival time of the direct wave 123. In this instance, the adaptive equalizer 202 that follows variations in the channels handles the preceding wave (the reflection wave 124) as a delayed wave, at the point of time when the direct wave has arrived. Then, the adaptive equalizer 202 handles the new arrival wave (the direct wave 123) as the preceding wave, and continues the operation.

Therefore, when the obstacle 126 exists, the adaptive equalizer 202 carries out a decision processing at the timing obtained from the reflection wave 124. When the obstacle 126 does not exist, the adaptive equalizer 202 carries out a decision processing at the timing obtained from the direct wave 123. In other words, the timing of the decision processing changes in the middle of the data section, and a timing slip occurs in the data section that is included in a second demodulation shown in the drawing. Therefore, a distance between the first unique word and the second unique word becomes different from the transmission data distance shown in the drawing that is known in advance.

The adaptive equalizer 202 receives the two CIR fixed initial values, and then judges a distance between the first unique word and the second unique word, thereby to judge presence or absence of a timing slip. The adaptive equalizer 202 obtains a decision value based on a demodulation by using the CIR fixed initial value that does not generate a timing slip and a received signal, and outputs this decision value to the decision value output terminal 2.

As explained above, according to the second embodiment, the blind equalization apparatus is structured such that the CIR initial value setter 204 sets a plurality of CIR fixed initial values to the adaptive equalizer 202, and further, the adaptive equalizer 202 judges a distance between unique words for individual demodulation results obtained based on the CIR fixed initial values, and selects a CIR fixed initial value that does not generate a timing slip. Therefore, it is possible to remove the conventional timing ambiguity.

In the second embodiment, a two-tap blind equalization apparatus corresponding to one symbol delay has been explained for the convenience of the explanation. However, the blind equalization apparatus is not limited to the above structure. It is also possible to obtain a similar effect to the above, when the invention is applied to a blind equalization apparatus of a plurality of taps corresponding to a plurality of symbol delays.

As explained above, according to the present invention, the adaptive equalizer is structured such that the CIR initial value setting unit sets a plurality of CIR initial values corresponding to arrival waves to the adaptive equalizing unit, and further, the adaptive equalizing unit judges a distance between unique words for individual demodulation results obtained based on the CIR initial values, and selects a CIR initial value that does not generate a timing slip. Therefore, there is an effect that it is possible to obtain a receiver capable of removing the conventional timing ambiguity.

According to the next invention, the blind equalization apparatus is structured such that "the CIR initial value setting unit sets a plurality of CIR fixed initial values to the adaptive equalizing unit, and further, the adaptive equalizing unit judges a distance between unique words for individual demodulation results obtained based on the CIR fixed initial values, and selects a CIR fixed initial value that does not generate a timing slip". Therefore, there is an effect that it is possible to obtain a receiver capable of removing the conventional timing ambiguity.

According to the next invention, the CIR initial value setting step sets a plurality of CIR initial values corresponding to arrival waves, and further, the adaptive equalizing step judges a distance between unique words for individual demodulation results obtained based on the CIR initial values, and selects a CIR initial value that does not generate a timing slip. Therefore, there is an effect that it is possible to remove the conventional timing ambiguity.

According to the next invention, the CIR initial value setting step sets a plurality of CIR fixed initial values, and further, the adaptive equalizing step judges a distance between unique words for individual demodulation results obtained based on the CIR fixed initial values, and selects a CIR fixed initial value that does not generate a timing slip. Therefore, there is an effect that it is possible to remove the conventional timing ambiguity.

INDUSTRIAL APPLICABILITY

As explained above, the receiver and the method of performing adaptive equalization processing according to the present invention are useful for radio communications that are carried out while moving at a high speed such as an automobile telephone.

The invention claimed is:

1. A receiver comprising:
   an adaptive equalization apparatus that judges transmission data series based on adaptive equalization processing, the adaptive equalization apparatus including
   a timing detecting unit that detects a timing suitable for an adaptive equalization processing, by using a first unique word that is disposed at a front side of a burst format that constitutes a received signal;
   a received signal extracting unit that extracts a standardized received signal based on the detected timing;
   a CIR initial value estimating unit that estimates an initial value of a channel impulse response by using a first unique word included in the extracted received signal;
   a CIR initial value setting unit that sets a plurality of channel impulse response initial values of different timings based on the estimated initial value; and
   an adaptive equalizing unit that individually judges presence or absence of a timing slip when each initial value is used, by judging a distance between the first unique word and a second unique word disposed at a back side, and obtains a decision value by using a channel impulse response initial value that does not generate a timing slip and the extracted received signal.

2. A receiver comprising:
   a blind equalization apparatus that judges transmission data series based on adaptive equalization processing, the blind equalization apparatus including
   a CIR initial value setting unit that sets a plurality of channel impulse response fixed initial values of different timings;
   an adaptive equalizing unit that individually judges presence or absence of a timing slip when each fixed initial value is used, by judging a distance between a first unique word disposed at a front side of a burst format that constitutes a received signal and a second unique word disposed at a back side of the burst format, and obtains a decision value by using a channel impulse response fixed initial value that does not generate a timing slip and the received signal;
   a timing detecting unit that detects a data timing from the decision value; and
   a decision value extracting unit that extracts the decision value based on the detected timing.

3. A method of performing adaptive equalization processing, the method comprising:
   detecting a timing suitable for the adaptive equalization processing, by using a first unique word that is disposed at a front side of a burst format that constitutes a received signal;
   extracting a standardized received signal based on the detected timing;
   estimating an initial value of a channel impulse response by using a first unique word included in the extracted received signal;
   setting a plurality of channel impulse response initial values of different timings based on the estimated initial value; and
   individually judging presence or absence of a timing slip when each initial value is used, by judging a distance between the first unique word and a second unique word disposed at a back side, and obtaining a decision value by using a channel impulse response initial value that does not generate a timing slip and the extracted received signal.

4. A method of performing adaptive equalization processing, the method comprising:
   setting a plurality of channel impulse response fixed initial values of different timings;
   individually judging presence or absence of a timing slip when each fixed initial value is used, by judging a distance between a first unique word disposed at a front side of a burst format that constitutes a received signal and a second unique word disposed at a back side of the burst format, and obtaining a decision value by using a channel impulse response fixed initial value that does not generate a timing slip and the received signal;
   detecting a data timing from the decision value; and
   extracting the decision value based on the detected timing.

* * * * *

UNITED STATES PATENT AND TRADEMARK OFFICE
CERTIFICATE OF CORRECTION

| | | |
|---|---|---|
| PATENT NO. | : 7,054,390 B2 | Page 1 of 1 |
| APPLICATION NO. | : 10/111420 | |
| DATED | : May 30, 2006 | |
| INVENTOR(S) | : Okazaki | |

It is certified that error appears in the above-identified patent and that said Letters Patent is hereby corrected as shown below:

On the title page, Item (30), the Foreign Application Priority Data information is incorrect. Item (30) should read:

-- (30) Foreign Application Priority Data

Sep. 21, 2000    (JP) …………………...2000-287699 --

Signed and Sealed this

Fourteenth Day of November, 2006

JON W. DUDAS
*Director of the United States Patent and Trademark Office*